Figure 1:
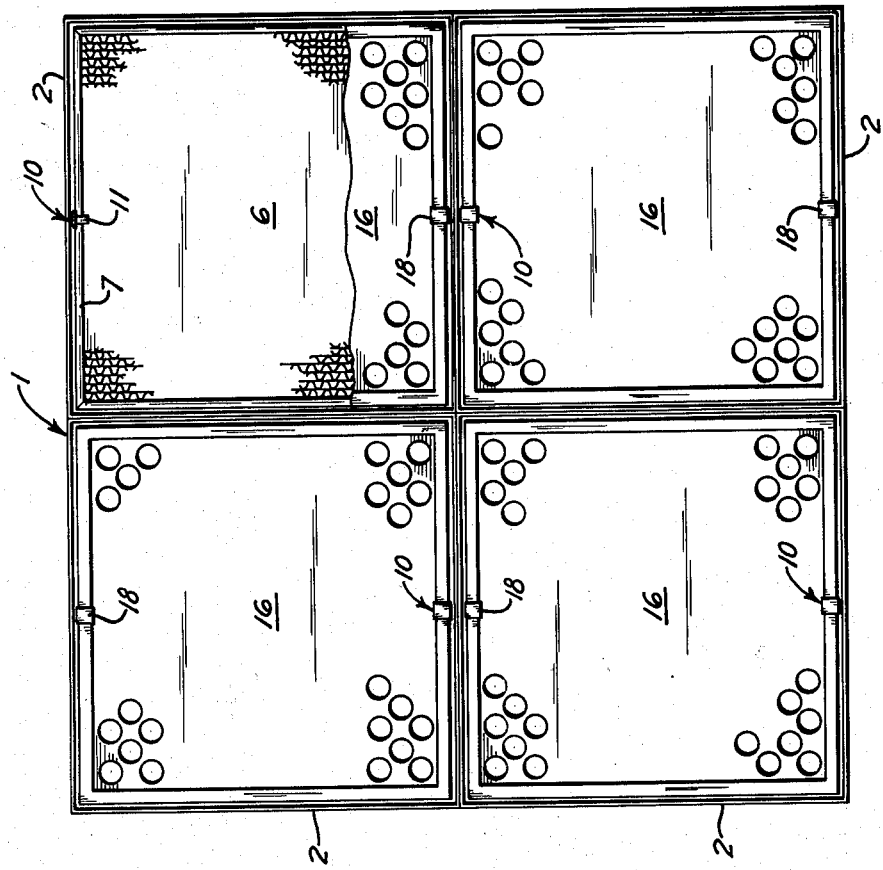

May 10, 1966 P. D. ANDREWS 3,250,063
FILTER AND CLIPS FOR HOLDING SAME IN A FRAME
Filed Oct. 31, 1963 2 Sheets-Sheet 1

INVENTOR.
PAUL D. ANDREWS.
BY
Brown, Critchlow, Flick & Peckham.
ATTORNEYS.

May 10, 1966 P. D. ANDREWS 3,250,063
FILTER AND CLIPS FOR HOLDING SAME IN A FRAME
Filed Oct. 31, 1963 2 Sheets-Sheet 2
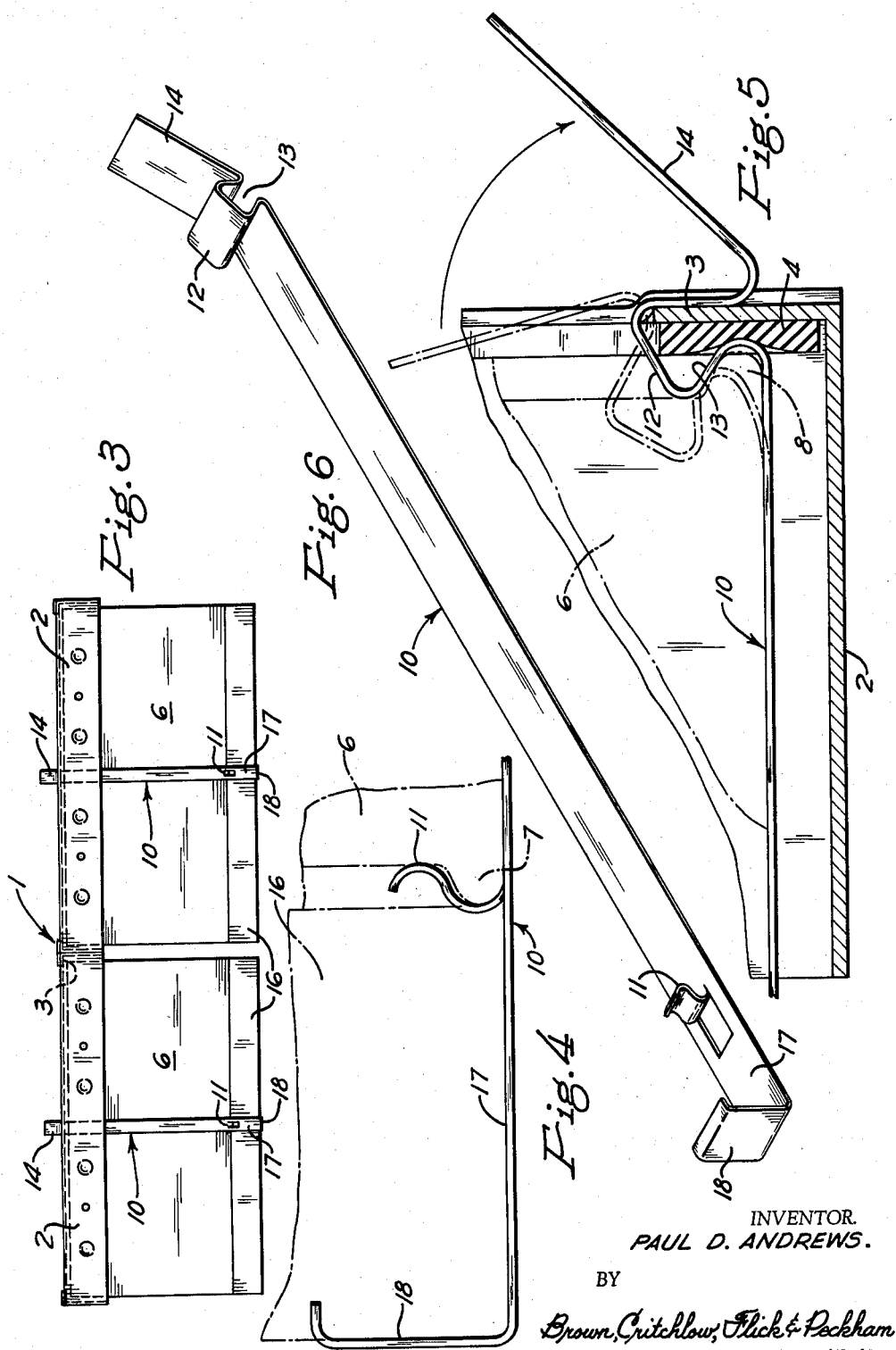
INVENTOR.
PAUL D. ANDREWS.
BY
Brown, Critchlow, Flick & Peckham.
ATTORNEYS.

United States Patent Office 3,250,063
Patented May 10, 1966

3,250,063
FILTER AND CLIPS FOR HOLDING SAME IN A FRAME
Paul D. Andrews, Pittsburgh, Pa., assignor to M.S.A. Research Corp., Pittsburgh, Pa., a corporation of Pennsylvania
Filed Oct. 31, 1963, Ser. No. 320,327
1 Claim. (Cl. 55—483)

This invention relates to filtering apparatus, and more particularly to means for holding filters in their supporting frames.

Filtering apparatus usually includes a frame in which a filter is removably mounted. Several frames may be joined side by side to provide for a bank of filters. In order to hold the filters in the frames various means have been proposed and used, but heretofore such means have been expensive, complicated, time-consuming to install and generally inapplicable to any frame not designed especially to receive them. The result of the last-mentioned shortcoming has been that the filter in a given frame could not be replaced by a filter of another manufacturer because the holding means furnished with the original filter could not be used satisfactorily for the substitute filter.

It is among the objects of this invention to provide means for holding filters in frames, which are simple and inexpensive, which can be quickly and easily installed or removed, and which can be used satisfactorily with the frames of several different manufacturers.

In accordance with this invention the holding means for a filter consist of a pair of clips, each formed from a resilient strip having front and rear ends. Each strip is provided near its front end with an inwardly projecting tongue that can be hooked over the adjoining front edge of the filter. The strip is provided near its rear end with an inward projection to be hooked over the back edge of the filter. Behind this projection the strip has a transverse outwardly opening recess to receive the customary rear flange of the frame in which the filter is to be mounted. Preferably, the projection and recess are formed by bending the strip to provide an inwardly projecting loop. The portion of the strip between its recess and rear end is inclined inwardly and rearwardly to such an extent that when the filter is inserted in a frame the inclined portions of two opposed clips will slide rearwardly across the edge of the frame flange to spring the rear ends of the loops inwardly until they can snap out behind the flange to hold it in the clip recesses and thereby connect the clips and frame. Each clip strip may extend a predetermined distance in front of its tongue and have an inwardly bent portion at its front end for hooking over the front edge of a pre-filter engaging the front face of the main filter.

Figure 2:
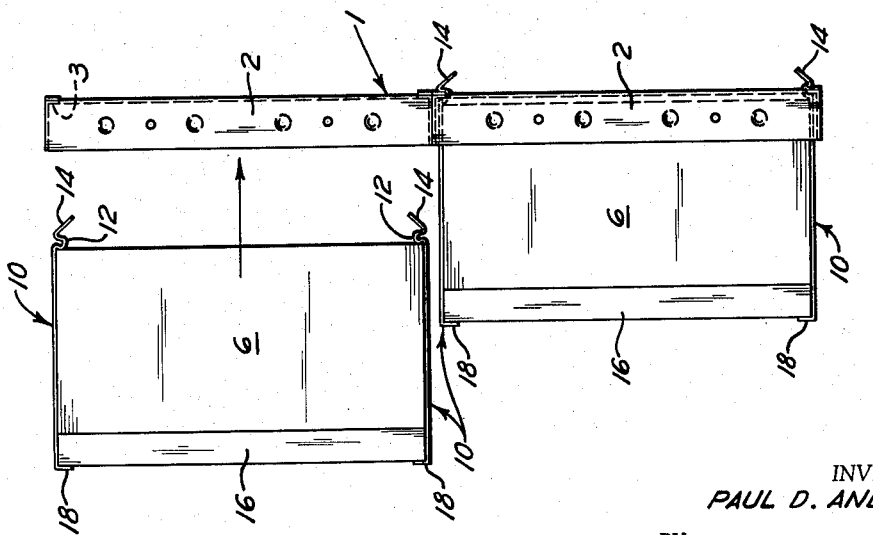

The preferred embodiment of the invention is illustrated in the accompanying drawings, in which:

FIG. 1 is a front view of the filtering apparatus;
FIG. 2 is a side view, with one on the filters about to be inserted in a frame;
FIG. 3 is a plan view;
FIG. 4 is an enlarged fragmentary side view of the front end portion of a retaining clip;
FIG. 5 is a fragmentary vertical section of a frame, showing a clip clamped in place; and
FIG. 6 is a perspective view of a clip.

Referring to the drawings, a framework 1 is shown, which is formed from a plurality of rectangular frames 2 in order to hold a bank of filters. The adjoining side walls of the different frames are riveted or otherwise fastened together to form the framework. The rear edges of the four side walls of each frame are turned inward to provide a flange 3 around the inside of the frame. A sealing gasket 4 may be attached to the front face of this flange.

Inserted in each frame and projecting forward therefrom is the back portion of a rectangular filter 6 of any suitable construction. In most cases the front and rear marginal portions of the filter side walls are turned inwardly a short distance to form beads 7 and 8 overlapping the edges of the front and back faces of the filter. The rear bead 8 of the filter engages gasket 4 in the rear part of the frame in sealing contact with it.

It is a feature of this invention that each filter may be detachably held securely in its frame by a pair of quickly installed clips. The clips engage two opposite sides of the filter, preferably its upper and lower sides. Each clip consists of a narrow resilient strip 10, made of a suitable material such as spring steel or a plastic, that extends from front to back of the filter. Near its front end the strip is provided with an inwardly projecting tongue 11 shaped to overlie or hook over bead 7 at the adjoining front edge of the filter. Near its rear end the strip is provided with another projection that hooks over the rear edge bead 8 of the filter. Preferably, this projection is formed by reversely bending the strip to provide an inwardly projecting loop 12. The inside of the loop forms an outwardly opening recess 13 that receives frame flange 3 and gasket 4 so that they are clamped in the loop to attach the clip to the frame. In order to open or temporarily deform the loop so that it can be applied to the flange in a manner about to be described, the end portion 14 of the strip between recess 13 and the rear end of the strip is inclined rearwardly and inwardly.

After the two clips have been applied to opposite sides of a filter by hooking their tongues and loops over its front and back edges, the rear end of the unit is inserted in a frame 2 and pushed backwardly therein. This slides the inclined portions 14 of the clips back across the inner edge of the frame flange and thereby springs the rear ends of loops 12 inwardly so that they can pass the flange and then snap out behind it. The two clips are thus hooked around the frame flange to attach the clips to the frame. The clips also hold the rear bead 8 of the filter tightly against gasket 4. To remove a filter from the frame, it is only necessary to spring the front end of the clips outwardly away from each other to unhook their tongues 11 from the front edges of the filter. The filter then can be pulled forward out of the frame and clips, and the clips will fall out of the frame or can be easily removed from it.

These clips also can be formed to hold a pre-filter 16 in front of the main filter just described when it is desired that the gas being filtered should flow through a coarse filter first in order to remove the larger foreign particles from the gas before it reaches the main filter. To hold the pre-filter, the front end portions 17 of the clips are extended forward from their tongues 11 along opposite sides of the pre-filter, and the front end of each clip has an inwardly bent portion 18 or tongue for hooking over the adjoining front edge of the pre-filter. The pre-filter therefore is clamped between the main filter and the front ends of the clips, the two filters being held together by only the two clips. The pre-filter can be put in place before the main filter is inserted in its frame, or the pre-filter can be added or removed later.

It will be seen that the retaining clips are extremely simple and inexpensive and that only two are required for each frame. They can be quickly and easily secured to a filter and then attached to the frame by merely pushing the filter back into the frame. The frame and its flange can vary somewhat in size, as long as the flange is wide enough to overlap rear bead 8 of the filter.

I claim:
The combination with a main filter having front and back faces connected by sides, and a frame surrounding it and provide with a laterally projecting flange overlapping the back of said filter, of a pair of clips having front and rear ends and engaging opposite sides of the filter for holding it in the frame, each clip being a resilient strip provided near its front end with a laterally projecting tongue hooked over the front edge of said filter, and a rectangular pre-filter engaging the front face of the main filter, said strips extending forward beside the pre-filter and having laterally bent front end portions hooked over its front edge, each strip being bent near its rear end to provide a laterally projecting loop hooked over the back edge of the main filter and forming a recess receiving said flange, each strip having a terminal portion projecting rearwardly from its loop behind the frame, the terminal portions being manually movable inwardly toward each other to spring the rear ends of said loops inwardly toward each other until said filters and clips can be pulled forward away from the frame flange, and said terminal portions being inclined inwardly toward each other sufficiently to permit insertion of said filters in the frame by pushing said terminal portions rearwardly across the inner edge of the frame flange to spring the rear ends of said loops inwardly toward each other until they snap out behind the flange.

References Cited by the Examiner

UNITED STATES PATENTS

| | | |
|---|---|---|
| 1,924,986 | 8/1933 | Frazier. |
| 2,062,649 | 12/1936 | Hegan _____ 55—484 X |
| 2,214,750 | 9/1940 | Myers _____ 55—483 X |
| 2,253,847 | 8/1941 | Crum. |
| 2,472,058 | 6/1949 | Artley. |
| 2,598,492 | 5/1952 | Boes _____ 24—259 X |
| 2,759,228 | 8/1956 | Gordon _____ 55—505 X |
| 2,771,155 | 11/1956 | Palmore _____ 55—502 |
| 2,779,431 | 1/1957 | McMullen et al. ____ 55—507 X |
| 2,836,258 | 5/1958 | Price _____ 55—507 |

ROBERT F. BURNETT, *Primary Examiner.*